US007003564B2

(12) United States Patent
Greuel et al.

(10) Patent No.: US 7,003,564 B2
(45) Date of Patent: Feb. 21, 2006

(54) METHOD AND APPARATUS FOR CUSTOMIZABLY CALCULATING AND DISPLAYING HEALTH OF A COMPUTER NETWORK

(75) Inventors: James R Greuel, Ft Collins, CO (US); John C Adams, Westminster, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 968 days.

(21) Appl. No.: 09/764,563

(22) Filed: Jan. 17, 2001

(65) Prior Publication Data

US 2002/0133584 A1 Sep. 19, 2002

(51) Int. Cl.
*G06F 15/173* (2006.01)

(52) U.S. Cl. ....................................... 709/224; 709/223

(58) Field of Classification Search ................ 709/223, 709/224, 220–222, 227, 228
See application file for complete search history.

(56) References Cited

U.S. PATENT DOCUMENTS

| | | | |
|---|---|---|---|
| 5,097,469 A | 3/1992 | Douglas | 371/20.1 |
| 5,546,540 A | 8/1996 | White | 395/200.1 |

(Continued)

OTHER PUBLICATIONS

"Reporting and Data Analysis with HP OpenView Network Node Manager",Rev. 1, Hewlett-Packard, Nov. 1999, Chapter 5, pp. 87-98.

(Continued)

*Primary Examiner*—David Wiley
*Assistant Examiner*—Yemane M. Gerezgiher

(57) ABSTRACT

Apparatus and methods facilitate customizable and extensible performance monitoring of a computer network. One method accepts a composite score definition in terms of N system variables, wherein N≧2; determines N raw data values, each raw data value corresponding to one of the N system variables; computes the composite score in accordance with the definition using the N raw data values as inputs; and outputs the composite score. The composite score definition is preferably in the form of a markup language, such as XML. The composite score definition preferably comprises, for each of the N system variables, a mapping and a weight. Preferably the composite score is displayed in at least one graphic form, such as a dial gauge, a bar indicator or a number, on a hypertext page. The hypertext page preferably contains one or more links to hypertext pages containing information regarding the scores and/or raw data values from which the composite score is derived. Another method accepts a mapping by which a raw data value associated with a corresponding system variable is mapped to a score, determines a raw data value corresponding to the system variable, converts the raw data value to a score in accordance with the mapping; and produces an output based on the score. One apparatus comprises a composite score definition, a data collector, a calculation logic and an output. The data collector collects a raw data value corresponding to one of the N system variables. The calculation logic is connected to the data collector and calculates the composite score in accordance with the definition using the N raw data values as inputs. The composite score is conveyed by way of the output. Preferably, the data collector comprises a database in which at least some of the raw data values are stored and a communication module by which at least some of the raw data values are transported, preferably according to the SNMP and/or the ICMP protocols. Another apparatus comprises a mapping, a data collector, a converter and an output. A raw data value associated with a corresponding system variable is mapped to a score, according to the mapping.

43 Claims, 8 Drawing Sheets

U.S. PATENT DOCUMENTS

| | | | | | |
|---|---|---|---|---|---|
| 5,615,323 | A | | 3/1997 | Engel et al. | 395/140 |
| 5,719,882 | A | | 2/1998 | Ellis | 371/33 |
| 5,819,028 | A | * | 10/1998 | Manghirmalani et al. | 714/57 |
| 5,886,643 | A | | 3/1999 | Diebboll et al. | 340/825.08 |
| 5,930,476 | A | * | 7/1999 | Yamunachari et al. | 709/224 |
| 6,003,077 | A | | 12/1999 | Bawden et al. | 709/223 |
| 6,032,183 | A | | 2/2000 | Chen et al. | 709/223 |
| 6,061,723 | A | * | 5/2000 | Walker et al. | 709/224 |
| 6,111,561 | A | | 8/2000 | Brandau et al. | 345/121 |
| 6,115,393 | A | | 9/2000 | Engel et al. | 370/469 |
| 6,151,023 | A | * | 11/2000 | Chari | 345/854 |
| 6,253,243 | B1 | * | 6/2001 | Spencer | 709/224 |
| 6,269,398 | B1 | * | 7/2001 | Leong et al. | 709/224 |
| 6,269,401 | B1 | * | 7/2001 | Fletcher et al. | 709/224 |
| 6,271,845 | B1 | * | 8/2001 | Richardson | 345/764 |
| 6,339,750 | B1 | * | 1/2002 | Hoyer et al. | 702/182 |
| 6,456,306 | B1 | * | 9/2002 | Chin et al. | 345/810 |
| 6,501,442 | B1 | * | 12/2002 | Schunicht | 345/2.1 |
| 6,553,416 | B1 | * | 4/2003 | Chari et al. | 709/224 |
| 6,625,657 | B1 | * | 9/2003 | Bullard | 709/237 |
| 6,664,987 | B1 | * | 12/2003 | Tarbox et al. | 345/853 |
| 6,704,284 | B1 | * | 3/2004 | Stevenson et al. | 370/241 |
| 2002/0012011 | A1 | * | 1/2002 | Roytman et al. | 345/736 |

OTHER PUBLICATIONS

Andrix, Beth, “Concord Unveils New eHealth Strategy and Solution” [online], Jan. 17, 2000, [retrieved on Jan. 11, 2001]. Retrieved from the Internet <URL: http://www.concord.com/corp/media/uspress/ccdocrytk3c.html>.

Zeichick, Alan, “Predicting Failure” [onlin ], Aug. 30, 2000, [r trieved on Jan. 11, 2001]. Retrieved from the Int rnet: <http://www.concord.com/products/inother/ccd5p2yikcc.html.

“Concord Adds Fault Diagnosis, Proactive Management And Capacity Planning Capabilities to HP OpenView”, Nov. 8, 2000, US Press Release [online]. Concord Communications. [Retrieved on Jan. 11, 2001] Retrieved from the Internet: <http://www.concord.com/products/inother/ccdkzxf7bfc.html.

Frequently AskQuestions. Reporting [online]. Concord Communications. [retrieved on Jan. 11, 2001]. Retrieved from the Internet: <URL: http://www.concord.com/products/faqs/report.htm.

Frequently AskQuestions. Network H alth [online]. Concord Communications. [retrieved on Jan. 11, 2001]. Retriev d from the Internet: <URL: http://www.concord.com/products/faqs/market.htm.

Network Health [online]. Concord Communications. [retrieved on Jan. 11, 2001]. Retrieved from the Internet: <URL: http://www.concord.com/products/ehealth/nethealth/network.htm>.

* cited by examiner

230

233

ROUTER HEALTH

| RESOURCE | OVERALL SCORE | INTERFACE HEALTH | CPU UTIL. | COMMENTS |
|---|---|---|---|---|
| cisco2522 | 100% | 100% | 20% | Reset 20 hrs ago |
| cisco4K1.end.com | 90% | 100% | 33% | |
| Cust1.cust.com | 80% | 60% | 13% | |
| ISPGlobalNet.ISP1.com | 60% | 100% | 82% | |
| ISpop.end.com | 60% | 60% | 55% | |
| peerISP3.com | 0% | 0% | unavail. | Offline |
| VIC1.cust2.com | 100% | 100% | 18% | |
| | | | | |

| RESOURCE | OVERALL HEALTH | UP/DOWN | INBOUND ERROR RATE | OUTBOUND ERROR RATE |
|---|---|---|---|---|
| cisco2522: V110 | 100% | 100% | 0% | 0% |
| cisco2522: V11 | 100% | 100% | 2% | 0% |
| cisco2522: V101 | 100% | 100% | 0% | 1% |
| cisco2522: V001 | 100% | 100% | 1% | 3% |

METHOD AND APPARATUS FOR CUSTOMIZABLY CALCULATING AND DISPLAYING HEALTH OF A COMPUTER NETWORK

FIELD OF THE INVENTION

This invention relates generally to computer networks and more particularly to computer network monitoring.

BACKGROUND OF THE INVENTION

As "e-business" continues to become an increasingly vital part of how companies do business, the role of the computer networks that enable this becomes increasingly critical. Today's e-business companies turn to service providers—whether they be internal to their company or an external company—to provide reliable, available and high-performing computer networks and applications.

In addition to managing infrastructures and providing new services, service providers face an increasing challenge to attract, satisfy and retain customers. In turn, these customers demand more from their service providers, including greater visibility into the services they are outsourcing. Customers want assurances that the computer network on which their businesses depend are healthy and performing well. Service providers want their customers to be informed and to feel good about their computer networks.

SUMMARY OF THE INVENTION

The invention facilitates customized, extensible and flexible monitoring of the health or status of a computer network.

In one respect, the invention is a method for facilitating performance monitoring of a computer network. The method comprises the steps of accepting a composite score definition in terms of N different system variables, wherein $N \geqq 2$; determining N raw data values, each raw data value corresponding to one of the N system variables; computing the composite score in accordance with the composite score definition using the N raw data values as inputs; and outputting the composite score. The composition score definition is preferably in the form of a markup language, such as XML (extensible markup language). The outputting step preferably comprises the step of displaying the composite score in at least one graphic form, such as a dial gauge, a bar indicator and/or a number on a hypertext page. The hypertext output page preferably contains one or more links to hypertext pages containing information regarding the scores and/or raw data values from which the composite score is derived.

In another respect, the invention is a method for facilitating performance monitoring of a computer network. The method comprises the steps of accepting a mapping by which a raw data value associated with a corresponding system variable is mapped to a score; determining a raw data value corresponding to the system variable; converting the raw data value to a score in accordance with the mapping; and producing an output based on the score.

In yet other respects, the invention is computer readable media on which are embedded programs that perform the above methods.

In yet another respect, the invention is an apparatus. The apparatus comprises a composite score definition, a data collector, a calculation logic and an output. The composite score definition specifies the composite score in terms of N system variables, wherein $N \geqq 2$. The data collector is interfaced to the definition and collects, for each of the N system variables, a raw data value corresponding to one of the N system variables. The calculation logic is connected to the data collector and calculates the composite score in accordance with the definition, using the N raw data values as inputs. The composite score is conveyed by way of the output. Preferably, the data collector comprises a database in which at least some of the raw data values are stored and a communication module by which at least some of the raw data values are transported. In certain embodiments, the communication module operates according to the SNMP (simple network management protocol) and/or the ICMP (Internet control message protocol) protocols. Optionally, the apparatus comprises a filter, connected to the specification. The filter blocks access to certain system resources, according to a predetermined criteria.

In yet another respect, the invention is an apparatus. The apparatus comprises a mapping, a data collector, a converter and an output. A raw data value associated with a corresponding system variable is mapped to a score, according to the mapping. The data collector collects a raw data value corresponding to the system variable. The converter converts the raw data values into a corresponding score in accordance with the mapping. An indication based on the score is conveyed by the output.

In yet another respect, the invention is an apparatus. The apparatus comprises a means for accepting a composite score definition; a means for determining N raw data values, each raw data value corresponding to one of the N system variables; a means for converting each raw data value associated with a corresponding system variable into a score in accordance with its associated mapping, whereby N scores result; a means for combining the N scores in a weighted proportion according to their respective weights, so as to result in a composite score; and a means for outputting the composite score. The composite score definition comprises a list of N different system variables; for each system variable, a mapping by which a raw data value associated with the corresponding system variable is mapped to a score; and for each system variable, a weight;

In comparison to known prior art, certain embodiments of the invention are capable of achieving certain advantages, including some or all of the following: (1) customer satisfaction is increased with visibility of computer network health and status information; (2) service providers can provide this visibility as a competitive value-added service; (3) customer loyalty and retention is increased; (4) customers and/or service providers can define a customer's own customized network health score(s); (5) customers and/or service providers can quickly and easily modify a customer's customized health score definition(s) and their style of presentation; (6) by gaining better insight into the network, the customer can better plan for network expansion and equipment upgrades; and (7) by gaining better insight into the network, network operators and other technicians can better troubleshoot network problems. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

FIGS. 2A–2C illustrate exemplary network health display pages;

DETAILED DESCRIPTION OF A PREFERRED EMBODIMENT

Figure 1:
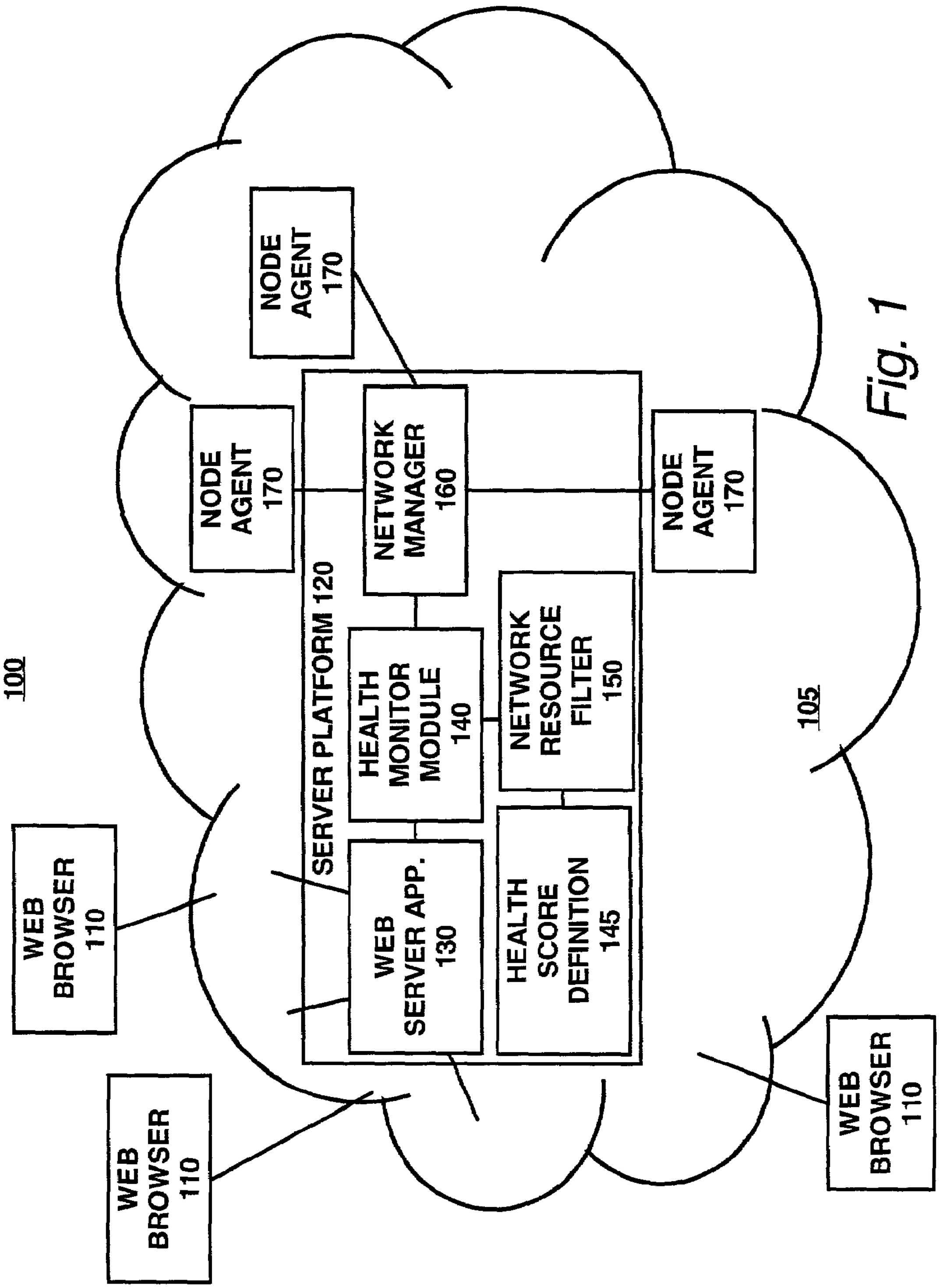
FIG. 1 is a block diagram of an environment of the invention.

FIG. 1 is a block diagram of an environment 100 of the invention. The environment 100 includes a computer network 105 and several web browsers 110 connected thereto. The computer network comprises a server platform 120. A service provider (e.g., Internet service provider, online service provider or company IT (information technology) group) provides the server platform 120 for use by a customer of the service provider. The customer may be, for example, a web site host. The server platform 120 includes a web server application 130, which hosts a web site accessed by the web browsers 110, according to the well-known HTTP (hypertext transfer protocol) protocol. Those who use the web browsers 110 may be customers of the service provider's customers. Thus, there are at least two levels of entities: (1) the service provider and (2) the service provider's customer.

The server platform 120 also includes a health monitoring module 140, health score definition 145, network resource filter 150 and a network manager 160. The health monitoring module 140 enables the service provider's customers to see how well the service provider is performing. More specifically, the health monitoring module 140 enables the service provider's customers to monitor the health of the computer network 105. The health score definition 145, through the network resource filter 150, defines what indications of network health are revealed to the customer. The network manager 160 collects data regarding performance of the network. The network manager 160 communicates with several remote node agents 170. A typical remote node agent 170 is associated with a network node, such as a switch, router or bridge. As such a node operates, its associated node agent 170 records raw performance statistics, which are reported in some form to the network manager 160. The health monitoring module 140 accesses the information obtained by the network manager 160 and, using this information, constructs the indications of network health for display as a web page (or part thereof) on the web server application 130. Customers of the service provider can then utilize one of the web browsers 110 to view the network health indications and perhaps the underlying data on which the health indications are based and/or other information that is of interest to the customer.

The network manager 160 is responsible for collecting status data from the network 105. The network manager 160 and the remote node agents 170 preferably communicate using the SNMP (simple network management protocol) and/or ICMP (Internet control message protocol) protocols. In one embodiment, the network manager 160 is Hewlett-Packard's Network Node Manager (NNM) product.

Under the SNMP protocol, the node agents 170 are SNMP agents, receiving and sending monitoring and control data, respectively. An SNMP agent typically returns information in the form of a MIB (management information base), which is a data structure defining a device's observable (e.g., discoverable or collectible) variables and controllable parameters. Many network devices, such as routers, hubs and gateways, support the SNMP protocol. A router MIB, for example, may contain fields for CPU utilization, up/down status for each interface, error rates on interfaces, congestion metrics (e.g., buffer levels, latency or packet discard rates) and the like.

The ICMP protocol supports ping or echo messages, which are round-trip messages to a particular addressed network device and then back to the originator. By issuing a ping to a network device, network manager 160 can determine whether the network device is online or offline (i.e., up or down) on the basis of whether the ping message is returned to the network manager 160. Because the ICMP protocol or other ping messages are universally supported, the network manager 160 can in this way determine the most important piece of status information (i.e., up/down status) for network devices that do not support the SNMP protocol.

Figure 2A:
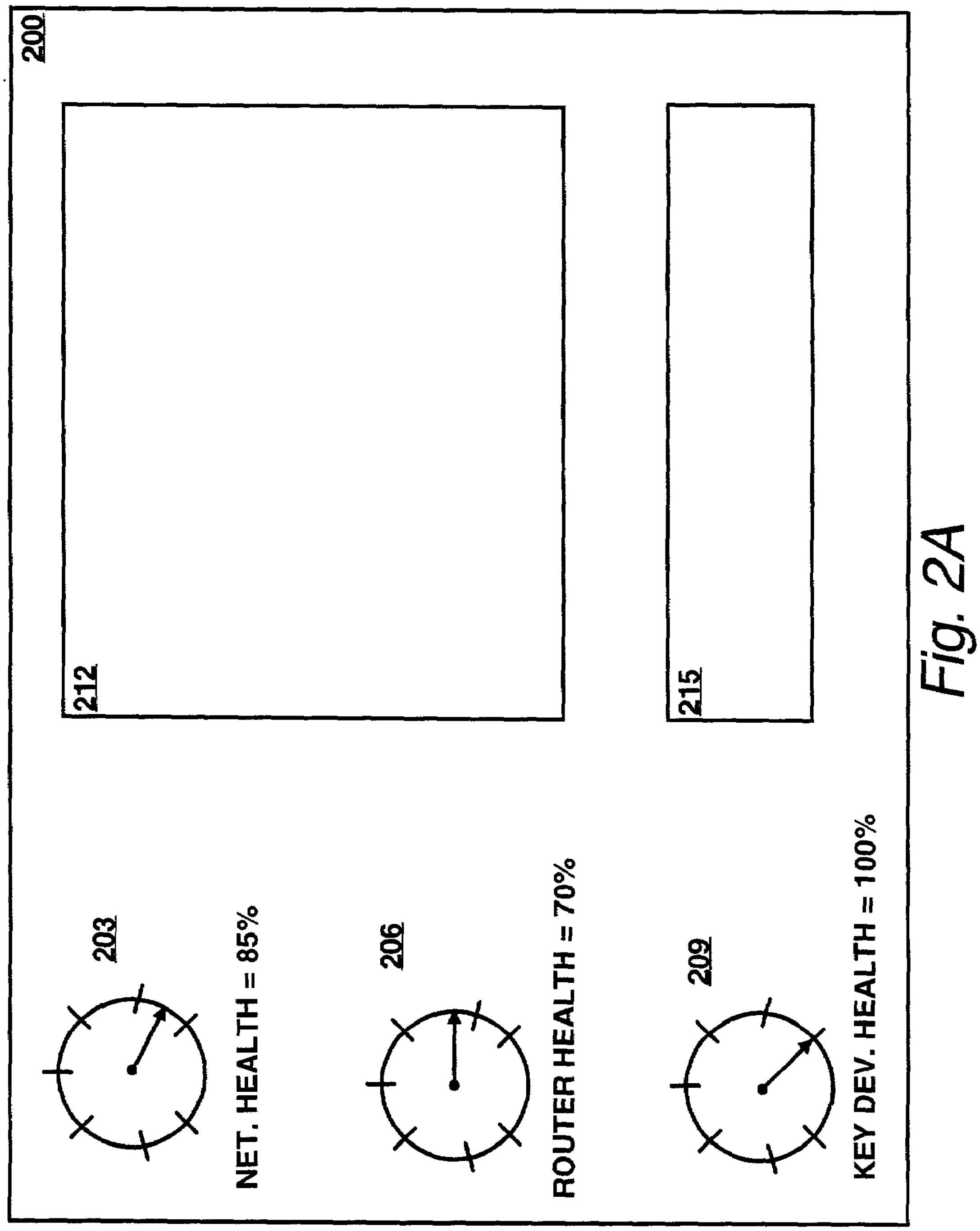

The network health indications are preferably displayed on one or more web pages. On a first web page is preferably shown one or more broad-based, general, overall or composite health scores. Hyperlinked to the first web page is one or more second layer web pages that contain finer details of the health data on which the composite score is based. Hyperlinking can continue for several layers as appropriate, each layer container finer and more detailed health data. FIGS. 2A–2C illustrate exemplary network health display pages 200, 230 and 260, respectively.

FIG. 2A illustrates a top level display page 200. The top level display page 200 contains three composite health indicators—an overall network health indicator 203, a router health indicator 206 and a key device health indicator 209. The top level display page 200 can also contain other display items 212 and 215, which may include a map of the network topology, alarm conditions or anything else. The health indicators 203–209 are illustrated as dial gauges along with numerical text. Any other style of indicator is possible, for example bar charts or a plot of the health score over time. In the exemplary top level display page 200, overall network health, router health and key device health are indicated. More or less composite health indicators are possible. A user of the display page 200 (i.e., a service provider's customer) can select composite health definitions from choices predefined by the service provider. Alternatively, the customer can define whatever composite health scores he/she desires and customize the display page to convey those scores. Other composite health scores that a user is likely to find useful are server health, CPE (customer premise equipment) health, and access link health. The service provider and/or the customer can specify which observable variables of those network elements are used in calculating the composite score, how the observable variables are mapped from raw data values into component scores and how the various component scores are combined to form the composite score. For example, the overall network health score may be an average of other composite scores; the composite router health score can be a weighted average of component scores computed for each router in the network, with the more important routers being more heavily weighted; and the key device health score can be a combination of certain network metrics and component health scores for certain, critical network components.

The composite health indicators 203–209 are preferably hyperlinked to second level web pages that display more detailed information on which the composite score is based, so that when a user clicks on one of the composite health indicators 203–209, a second level display page is generated on the browser 110. As an example, FIG. 2B illustrates a second level display page 230 for router health. Although many formats are possible, the second level display page 230 is presented as a table 233. Each row in the table 233 corresponds to a particular router in the network 105. The table 233 contains columns for the router name (or address), overall health for that router, interface health, CPU (central processing unit) utilization and comments. The overall score in this example is computed as the weighted average of two numbers: (1) the interface health and (2) and a score mapped from the CPU utilization. An illustrative mapping of the CPU utilization into a score is the following:

| CPU Utilization | Score |
|---|---|
| 0–50 | 100% |
| 50–60 | 80% |
| 60–70 | 60% |
| 70–80 | 40% |
| 80–100 | 10% |

This mapping reflects the fact that a higher CPU utilization is characteristic of an overworked and probably poorly performing router. This mapping also maps a range into a single score value. Other mappings are possible, including mathematical formulas and even the identity function (i.e., no conversion at all, like the interface health in this example).

Certain entries in the table 233 can be hyperlinks to yet more detailed information about that entry. For example, the numbers in the interface health column of the table 233 can be hyperlinks. Clicking on the "100%" interface health score corresponding to the router resource named "cisco2522" generates the a third level display page 260, as illustrated in FIG. 2C. The third level display page 260 contains a table 263 having on each row information about a particular interface of the router. The table 263 has columns for the name (or address) of the router interface resource, overall health, up/down status, inbound error rate and outbound error rate. The type of information contained in the table 263 is limited only by what is observable. For each interface, the overall health score is calculated as a function of the up/down status and error rates in the same row. Preferably, the function is a weighted average.

Many variations of the tables 233 and 263 are possible. The format and appearance shown in FIGS. 2B and 2C are illustrative and not limiting. Health scores and the raw data on which they are based can be displayed together or separately, depending on the designer's or viewer's preference. As another example of stylistic variation contemplated within the scope of the invention, the rows of the table 233 or 263 can be ordered in ascending order of overall health score, thus allowing the viewer to first focus most naturally on those resources most needing attention.

As can be appreciated from FIGS. 2A–2C, meaningful and high-impact composite health scores can be built up from more fundamental network health data. By logically grouping multiple devices and calculating and outputting a single score for multiple devices (e.g., all routers), the user is presented with a powerful at-a-glance summary of the network health. A user can see the overall composite and then "drill down" through layers of more primitive data on which the overall composite score is based. Furthermore, the user can define how each layer is put together and the relationship between layers, as will be apparent from the description that follows.

Figure 3:
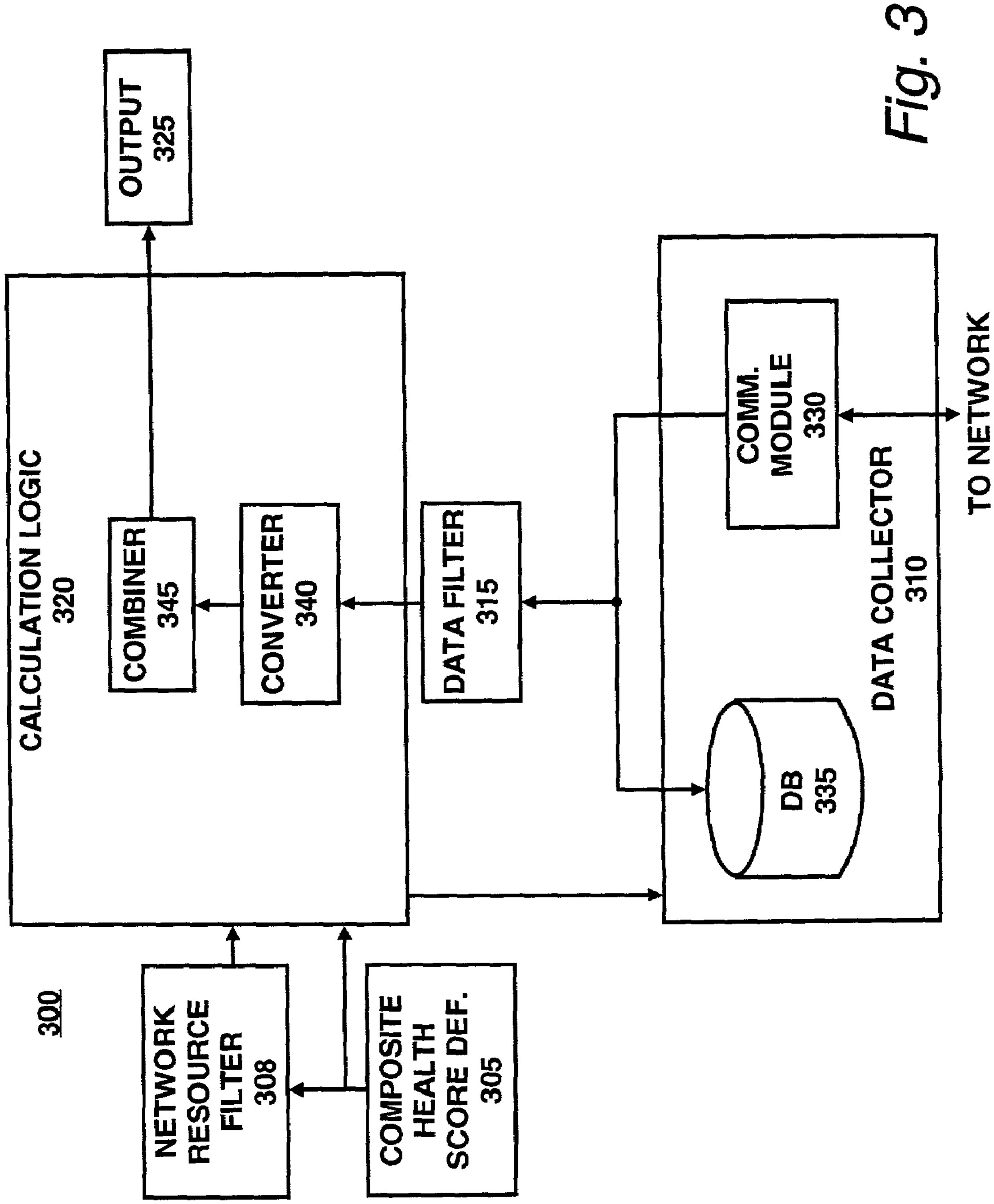
FIG. 3 is a block diagram of a software architecture according to an embodiment of the invention.

FIG. 3 is a block diagram of a software architecture 300 according to an embodiment of the invention. The software architecture 300 comprises a composite health score definition 305, a network resource filter 308, a data collector 310, a data filter 315, a calculation logic 320 and an output 325. The software architecture 300 is related to the block diagram of FIG. 1 as follows: the composite health score definition 305 is similar to the health score definition 145; the network resource filter 308 is similar to the network resource filter 150; the data collector 310 is similar to the network manager 160; and the data filter 315 along with the calculation logic 320 are similar to the health monitoring module 140.

The composite health score definition 305 is a file, preferably in the format of a markup language (e.g., XML), that specifies which system variables are used in forming the composite score, how each system variable should be converted from a raw data value into a health score and how the individual health scores are combined to produce the composite score. Because markup languages are standardized, popular and widely utilized by those skilled in the art, the composite health score definition 305 can be easily and quickly modified. The composite health score definition 305 may be part of a file that contains several other composite score definitions and/or other information.

The network resource filter 308 is an optional component of the software architecture 300. The network resource filter 308 reads the composite health score definition 305 and forwards a list of appropriate resources to the calculation logic 320. The health calculation logic 320 includes only those resources in its queries to the data collector 310 and subsequent calculations. Alternatively, the network resource filter 308 can be interfaced between the composite health score definition 305 and the data collector 310, in which case, the data collector 310 collects data from appropriate resources only.

The network resource filter 308 can be configured to prevent a user from observing certain system resources. The network resource filter 308 is useful when the author of the composite health score definition 305 is different from the owner of the observed network equipment. In a typical example of use, the network equipment is owned and operated by a service provider, while the author of the composite health score definition 305 is either the service provider or one of many customers of the service provider. Some network devices may not be of interest to a particular customer (perhaps because those network devices are isolated from the customer or dedicated for use by another customer). In such a case, the network resource filter 308 can be configured to prevent the customer from mistakenly or maliciously observing and/or using irrelevant system resources. Alternatively or additionally, filtering can be performed after data collection by the data filter 315.

The data collector 310 is responsible for collecting status data from various network devices. Illustrative status data include up/down status, error rates, packet discard rates, buffer levels, congestion metrics, latency metrics, retransmission counts, collision counts, negative acknowledgement counts, processor utilization metrics, storage utilization metrics and times since last failure/reset. The data collector can fetch status data as that data is requested or prefetch the data in advance of the time when it is needed. To enable prefetching, the data collector 310 preferably comprises a communications module 330 and a database 335. The communications module 330 connects to various network devices and determines their status. As the communications module 330 receives status information, it stores this information in the database 335. The database 335 can then be queried to extract this information. The database 335 may be a relational database accessible using the SQL (structured query language), JDBC (Java database connectivity) or ODBC (open database connectivity) programmatic interfaces.

The calculation logic 320 computes the composite score specified by the composite health score definition 305. The calculation logic comprises a converter 340 and a combiner 345. For each system variable specified in the composite health score definition 305, the converter converts a raw data value for a system variable into a score in accordance with a mapping specified by the composite health score definition 305. The mapping may be a table or a mathematical formula. The mapping may be the identity function (i.e., no actual change at all), which is the default if no mapping is specified. The combiner 345 combines all of the converted scores into a composite score. The combination may be a linear combination (e.g., weighted average) in accordance with weights specified by the composite health score definition 305. More generally, the combination could be any many-to-one function. The combiner 345 may provide multiple levels of combinations. For example, an overall combination might be one for overall network health, which is computed as a combination of four other composite scores: server health, access link health, router health and CPE health. Optionally, the calculation logic 320 can include other modules. For example, other modules might include time-based filters, such as moving averages (e.g., exponentially weighted moving average) over time.

The output 325 contains the composite score computed by the calculation logic 320. The output 325 is preferably a file in the format of a markup language document. The output 325 is preferably displayable on a computer screen. The output 325 preferably includes information in addition to the composite score. For example, the output 325 may be one or more XML pages, which can be transformed into one or several layers of display markup language (e.g., HTML (hypertext markup language)) pages. A first level page may contain the composite score and hyperlinks to second level pages that contain more detailed information, such as other scores on which the first level composite score is based. The output 325 can include additional, lower level pages containing further, finer details, as necessary.

In certain cases, some of the raw data needed to compute the composite score will be unavailable. In this case, the output 325 preferably contains an indication that some data is unavailable. In some embodiments, the calculation logic 320 can continue to compute the composite score while disregarding the missing data. As an example, if a composite access link health score is defined as the average of twenty access link health scores, but data for one access link is unavailable, then the composite score could be calculated as the average of the nineteen available access link health scores. A sufficiently sophisticated composite health score definition 305 can specify graceful handling of unavailable data. Alternatively or additionally, the calculation logic 320 can provide default rules for handling unavailable data.

Figure 4A:
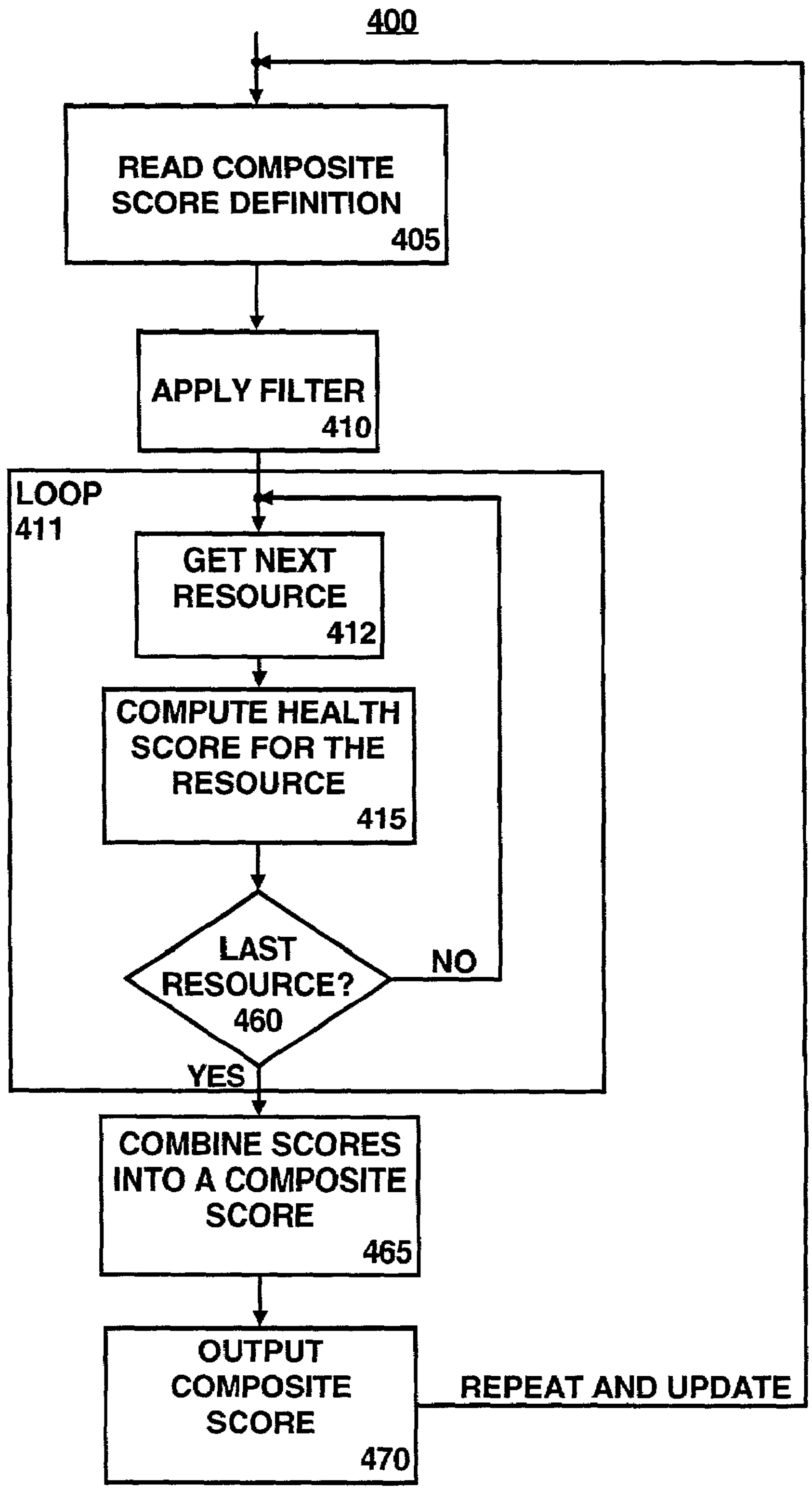
FIG. 4 is a flowchart of a method according to an embodiment of the invention.
Figure 4B:
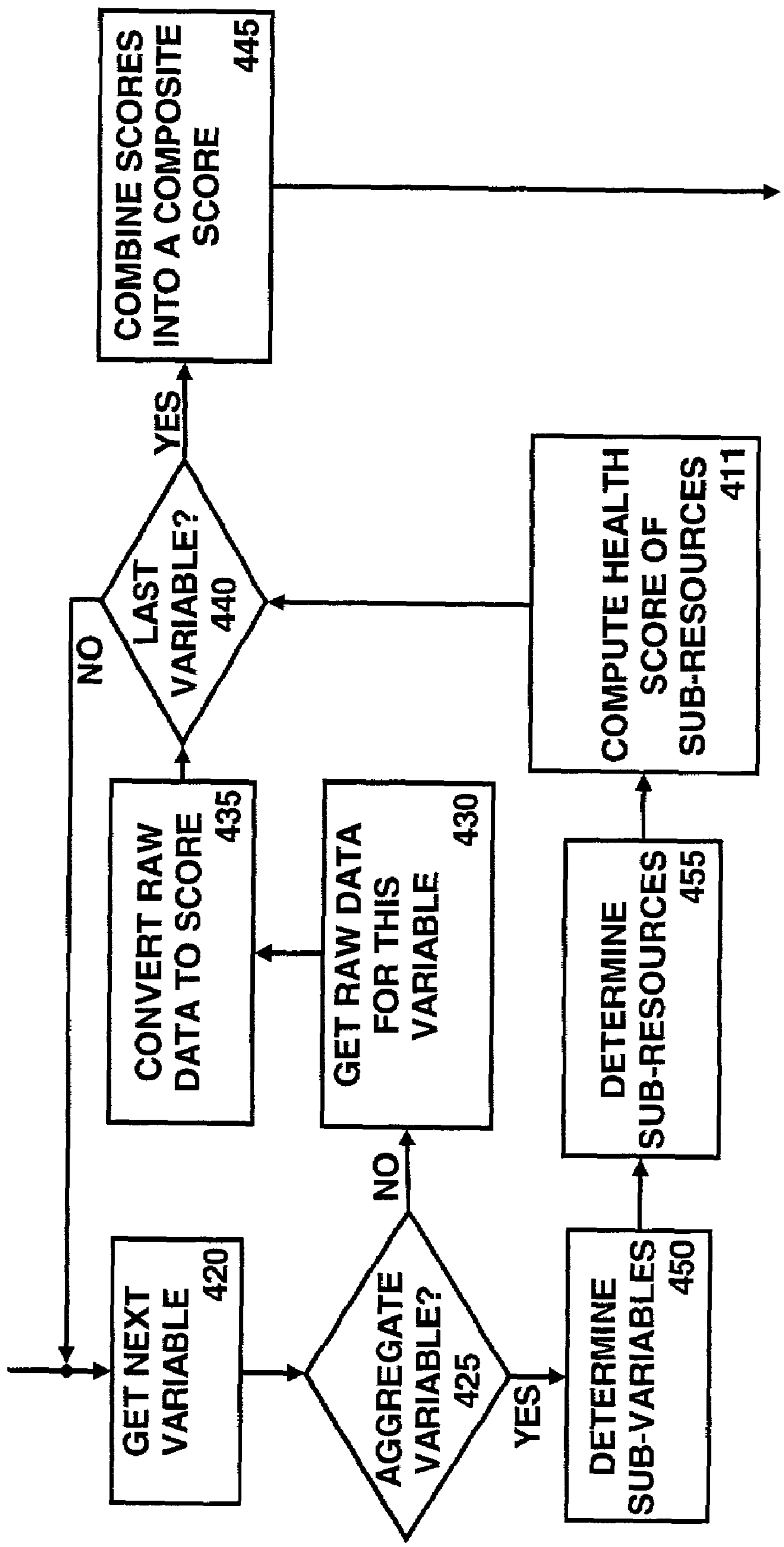

FIGS. 4A and 4B depict a flowchart of a method 400 according to an embodiment of the invention. The method 400 is implemented by the software architecture 300. The method 400 begins by reading (405) a composite score definition and filtering (410) the network resources specified in the composite score definition, according to an access criteria. The method 400 next performs a loop 411. The method 400 makes one pass through the loop 411 for each network resource (e.g., node or device) specified in the composite score definition. Each pass of the loop 411 gets (412) the next resource and computes (415) the health score for that resource. The method 400 tests (460) whether the current resource is the last and loops back to the resource getting step 412 if not. After a health score for every resource has been computed, the method 400 combines (465) the resource scores into a composite health score and outputs (470) the composite score, preferably by constructing one or more XML pages to display the composite score and possibly the component resource scores and raw data on which the composite score is based. The method 400 then repeats periodically or as triggered to update the composite score.

The health score computation step 415 is illustrated in greater detail in FIG. 4B. The health computation step 415 loops through all of the component variables that make up the health score for the resource. First in the loop, the method 400 gets (420) the next variable and tests (425) whether it is an aggregate variable. If it is not, then the method 400 gets (430) the raw data for this variable, converts (435) the raw data into a health score, according to a user-defined or default mapping, and tests (440) whether the current resource is the last. If not, the method 400 returns to the variable getting step 420 to get the next variable. If the current variable is the last one, then the method 400 combines (445) the converted scores into a composite score as a final step before the health score computation step 415 ends.

If the testing step 425 determines that the resource is an aggregate variable, then the method 400 determines (450) the sub-variables that make up the aggregate variable and determines (455) the sub-resources represented by the sub-variables. The health score computation step 415 then recurses by invoking the loop 411 (which executes the health computation step 415 additional times at the sub-resource level. The health score computation step 415 is recursively applied to the sub-resources, one at a time each pass through the loop 411. Optionally, the loop 411 can also include the filtering step 410 to check that the sub-resources should be revealed to the user of the method 400. After exiting the recursion, the method 400 goes to the testing step 440 to determine whether the aggregate resource is the last. If not, the method 400 returns to the variable getting step 420 to get next variable. After the last variable, the method 400 combines (445) all converted scores into a composite score, according to a function specified by the composite score definition.

The recursive nature of the health score computation step 415 allows multiple layers of compositing or aggregation. That is, a composite score can be a composite of several system resource or system variable health scores that are themselves composite scores of sub-resources, etc. Those skilled in the art can also appreciate that the steps of the method 400 can be performed in an order different from that illustrated, or simultaneously, in alternative embodiments.

Figure 5:
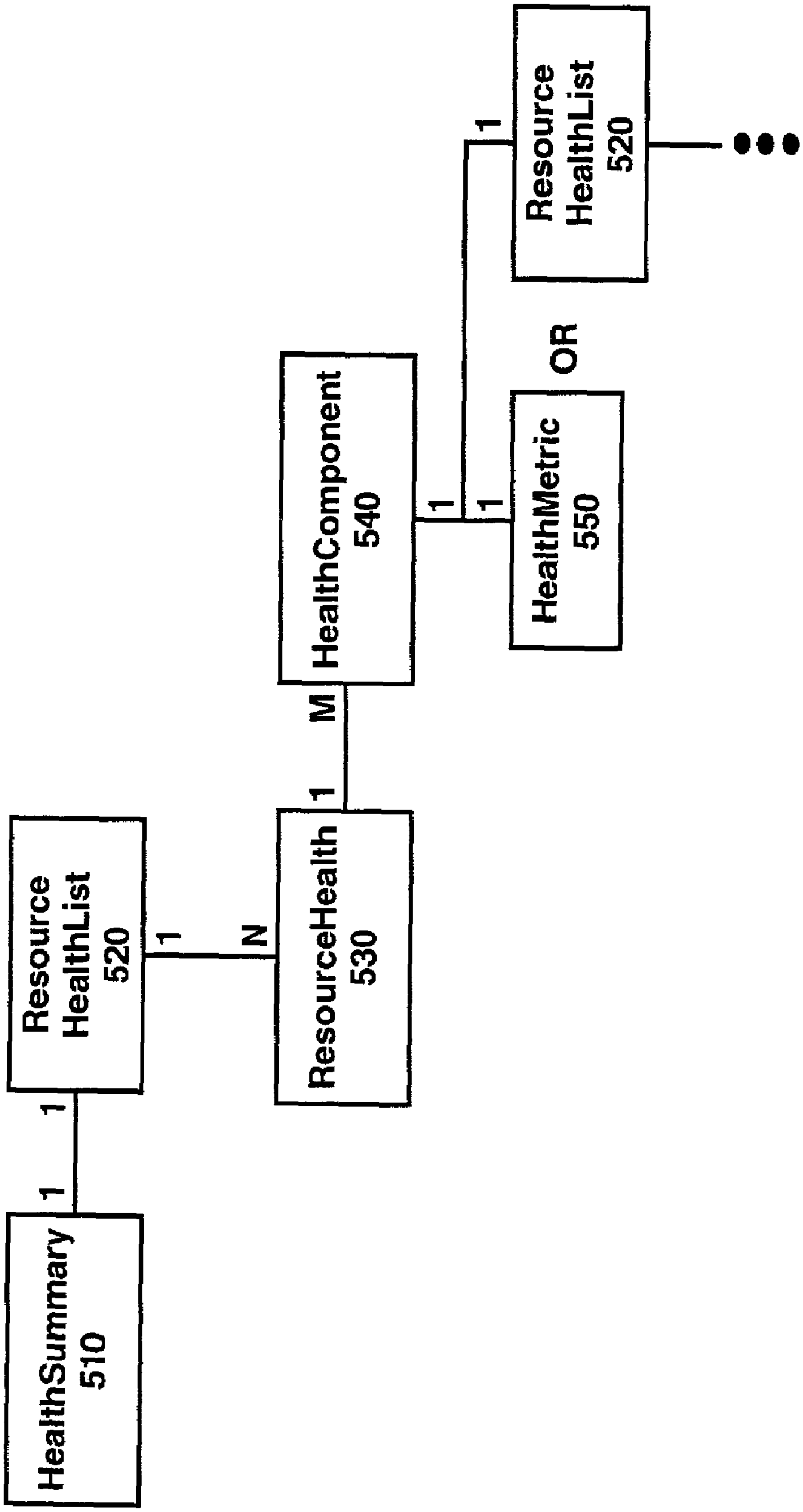
FIG. 5 is a class containment diagram of classes utilized in the method of FIG. 4.

FIG. 5 depicts a class containment diagram 500 of objects 510–550 that are preferably utilized in operation of the method 400. The HealthSummary object 510 is the grand object in which all others are contained directly or indirectly. The HealthSummary object 510 represents overall health for the network or a group of network resources, such as key devices, access links or routers. The HealthSummary object 510 contains one ResourceHealthList object 520, which is a list of some number (say, N) resources that constitute health for a health summary category. Each list item in the ResourceHealthList object 520 contains one ResourceHealth object 530, which represents the health of the particular resource. Each ResourceHealth object 530 contains some number (say, M) HealthComponent objects 540. A HealthComponent object 540 contains either a HealthMetric object 550 or a ResourceHealthList object 520. The HealthMetric object 550 is a basic performance statistic, such as CPU utilization or interface up/down status. The ResourceHealthList object 520 is the same list of network resources, as described above, and contains additional constituent objects in the same pattern as already illustrated in FIG. 5.

As an example, FIGS. 2A–2C correlate with FIG. 5 as follows: The router health indicator 206 is a graphical representation of one example of the HealthSummary object 510. The routers listed in the table 233 (FIG. 2B) together are stored as a list in the ResourceHealthList 520. Each "overall score" entry in the second column of the table 233 is represented by a ResourceHealth object 530. Each entry of the next two rows ("Interface Health" and "CPU Utilization") in the table 263 is a HealthComponent object 540. In the case of CPU Utilization, the HealthComponent object 540 contains a HealthMetric object 550, which is the measured utilization rate. In the case of Interface Health, the HealthComponent object 540 contains a ResourceHealthList object 520 that contains a list of the router interfaces, as shown in the table 263 (FIG. 2C). Note that FIG. 5, for the sake of clarity in explanation, does not illustrate weights, but weights or other combination factors can be part of the multiple objects.

The class of objects 510–550 is naturally suited for recursion of the health score computation step 415 in the method 400. The health score computation step 415 can traverse down the class of objects 510–550. The HealthSummary object 510 represents the composite score that is the final result of the method 400. The resources that are iterated in the resource getting step 420, health computation step 415 and testing step 460 (FIG. 4A) are the list items in the ResourceHealthList object 520, as individually called out in each ResourceHealth object 530. The variables that are iterated in the health computation step 415 (FIG. 4B) are the list items in the HealthComponent object 540, as individually called out in each HealthMetric object 530 (if not an aggregate variable) or the ResourceHealthList object 520 (if an aggregate variable). When the method 400 reaches the raw data getting step 430 from the testing step 425, it has reached a HealthMetric object 550. When the method 400 detects an aggregate variable at the testing step 425, it has reached another ResourceHealthList object 520.

New, higher level composite objects can be created easily using the object model illustrated in FIG. 5. A new object can be created and made to contain other component objects. For example, an object for overall network health can be made to contain several HealthSummary objects 510, one for router health, one for access link health, one for server health, etc. The new object can also include weights for combining each constituent HealthSummary object together in a weighted average.

The method 400 can be performed by a computer program. The computer program and the objects 510–550 can exist in a variety of forms both active and inactive. For example, the computer program and objects can exist as software comprised of program instructions or statements in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the computer program can be configured to access, including signals downloaded through the Internet or other networks. Concrete examples of the foregoing include distribution of executable software program(s) of the computer program on a CD ROM or via Internet download. In a sense, the Internet itself, as an abstract entity, is a computer readable medium. The same is true of computer networks in general.

What has been described and illustrated herein is a preferred embodiment of the invention along with some of its variations. The terms, descriptions and figures used herein are set forth by way of illustration only and are not meant as limitations. For example, the score calculated and output by the invention need not be a "health" score, and the score need not be a composite formed from two or more system variables, but may be a score derived from a mapping of a single system variable. Those skilled in the art will recognize that these and many other variations are possible within the spirit and scope of the invention, which is intended to be defined by the following claims—and their equivalents—in which all terms are meant in their broadest reasonable sense unless otherwise indicated.

What is claimed is:

1. A method for generating at least one composite health score indicating the health of at least a portion of a computer network comprising:

receiving a definition of said composite health score, said definition defining for each of a plurality of observable network resources a mapping between a plurality of raw performance data for said each observable network resource and a representative component health score representative of said health of said each observable network resource, and further defining a function defining how said component health scores for said plurality of observable network resources are combined to form said composite health score;

collecting said raw network performance data from at least one network resource;

converting, in accordance with said mapping for each said network resource, said collected raw data into said representative component health score for said each observable network resource; and combining said component health scores according to said function to form said composite health score.

2. The method of claim 1, wherein said composite health score definition is in the form of a markup language.

3. The method of claim 1, wherein the method further comprises:

filtering network resources specified in said composite health score definition according to access criteria to prevent access to certain networked resources on the computer network.

4. The method of claim 1, further comprising:

displaying said at least one composite health score on a hypertext page.

5. The method of claim 4, wherein said hypertext page contains at least one link to a hypertext page containing information regarding at least one of said component health scores or said raw network performance data from which said at least one displayed composite health score is derived.

6. The method of claim 1, wherein said composite health score is one of a group consisting of a composite network health score, a composite router health score, a composite customer premise equipment health score, a composite access link health score, a composite key device health score and a composite server health score.

7. The method of claim 1, wherein said function defining how said component health scores are combined to form said composite health score comprises:

a function defining a weighted average of said component health scores.

8. The method of claim 1, wherein said mapping for at least one of said plurality of network resources comprises:

a mapping that equates at least one value range of said collected raw performance data with a single value of said representative component health score.

9. The method of claim 1, wherein said mapping for at least one of said plurality of network resources comprises:

a mapping that translates at least one of said collected raw performance data values to a representative component health score value in accordance with a mathematical formula.

10. The method of claim 9, wherein for at least one of said at least one of said collected performance data values said mathematical formula comprises an identity function.

11. The method of claim 1, wherein at least one of said plurality of observable network resources comprises a network device selected from a group consisting of a node, a router, a hub, a server, a gateway, a switch, a bridge, a node interface, a link, and a customer premise equipment.

12. The method of claim 1, wherein the collected raw data comprises one or more of the following: an up/down status, an error rate, a packet discard rate, a buffer level, a congestion metric, a latency metric, a retransmission count, a collision count, a negative acknowledgement count, a processor utilization metric, a storage utilization metric and a time since last reset.

13. The method of claim 1, wherein said collecting raw data comprises:

collecting said raw performance data utilizing at least one protocol selected from a group consisting of Simple Network Management Protocol (SNMP) and Internet Control Message Protocol (ICMP).

14. The method of claim 1, wherein said collecting said raw network performance data from at least one network resource comprises:

communicating with a plurality of remote node agents each associated with a network node on the computer network to receive said raw performance data for said associated network node.

15. A computer-readable medium on which is embedded a software program, wherein, when executed, the program performs a method comprising:

receiving a definition of said composite health score, said definition defining for each of a plurality of observable network resources a mapping between a plurality of raw performance data for said each observable network resource and a representative component health score representative of said health of said each observable network resource, and further defining a function defining how said component health scores for said plurality of observable network resources are combined to form said composite health score;

collecting said raw network performance data from at least one network resource;

converting, in accordance with said mapping for each said network resource, said collected raw data into said representative component health score for the network resource; and combining said component health scores according to said function to form said composite health score.

16. The computer-readable medium of claim 15, wherein the method further comprises:

filtering network resources specified in said composite health score definition according to access criteria to prevent access to certain networked resources on the computer network.

17. The computer-readable medium of claim 15, further comprising:

displaying said at least one composite health score on a hypertext page.

18. The computer-readable medium of claim 17, wherein said hypertext page contains at least one link to a hypertext page containing information regarding at least one of said component health scores or said raw network performance data from which said at least one displayed composite health score is derived.

19. The computer-readable medium of claim 15, wherein said function defining how said component health scores are combined to form said composite health score comprises:

a function defining a weighted average of said component health scores.

20. The computer-readable medium of claim 15, wherein said mapping for at least one of said plurality of observable network resources comprises:

a mapping dial translates at least one of said collected raw performance data values to a representative component health score value in accordance with a mathematical formula.

21. The computer-readable medium of claim 20, wherein for at least one of said at least one of said collected performance data values said mathematical formula comprises an identity function.

22. The computer-readable medium of claim 15, wherein said collecting raw data comprises:

collecting said raw performance data utilizing at least one protocol selected from a group consisting of Simple Network Management Protocol (SNMP) and Internet Control Message Protocol (ICMP).

23. The computer-readable medium of claim 15, wherein receiving raw data comprises:

communicating with a plurality of remote node agents each associated with a network node on the computer network to receive said raw performance data for said associated network node.

24. An apparatus for generating at least one composite health score indicating the health of at least a portion of a computer network comprising:

a data collector configured to collect raw network performance data from at least one network resource; and calculation logic configured to calculate said composite health score using a definition defining for each of a plurality of observable network resources a mapping between a plurality of raw performance data for said each observable network resource and a representative component health score representative of said health of said each observable network resource, and further defining a function defining how said component health scores for said plurality of observable network resources are combined to form said composite health score.

25. The apparatus of claim 24, wherein said calculation logic comprises:

a converter configured to convert, in accordance with said mapping for each said network resource, said collected raw data into said representative component health score.

26. The apparatus of claim 24, wherein said calculation logic comprises:

a combiner configured to combine said component health scores according to said function to form said composite health score.

27. The apparatus of claim 24, wherein the apparatus further comprises:

a filter, connected between the composite score definition and the data collector, wherein the filter blocks access to certain system resources, according to a predetermined criteria.

28. The apparatus of claim 24, wherein the apparatus further comprises:

a filter, connected between the data collector and the converter, wherein the filter excludes certain raw data, according to a predetermined criteria.

29. The apparatus of claim 24, wherein said data collector operates in accordance with a protocol selected from the group consisting of SNMP and ICMP.

30. An apparatus for generating at least one composite health score indicating the health of at least a portion of a computer network comprising:

means for collecting raw network performance data from at least one network resource;

means for converting said collected raw data into said representative component health score in accordance with a mapping included in a definition of said composite health score, wherein said mapping defines for each of a plurality of observable network resources, how a plurality of raw performance data for said each observable network resource is to be converted to a representative component health score representative of said health of said each observable network resource; and means for combining said component health scores for said plurality of observable network resources in accordance with a function included in said composite health score definition, wherein said function defines how said component health scores are combined to form said composite health score.

31. The apparatus of claim 30, wherein said composite health score definition is in the form of a markup language.

32. The apparatus of claim 30, further comprising:

means for filtering network resources specified in said composite health score definition according to access criteria to prevent access to certain networked resources on the computer network.

33. The apparatus of claim 30, further comprising:

means for displaying said at least one composite health score on a hypertext page.

34. The apparatus of claim 33, wherein said hypertext page contains at least one link to a hypertext page containing information regarding at least one of said component health scores or said raw network performance data from which said at least one displayed composite health score is derived.

35. The apparatus of claim 33, wherein said function defining how said component health scores are combined to form said composite health score comprises:

a function defining a weighted average of said component health scores.

36. The apparatus of claim 33, wherein said mapping for at least one of said plurality of network resources comprises:

a mapping that equates at least one value range of said collected raw performance data with a single value of said representative component health score.

37. The apparatus of claim 33, wherein said mapping for at least one of said plurality of network resources comprises:

a mapping that translates at least one of said collected raw performance data values to a representative component health score value in accordance with a mathematical formula.

38. The apparatus of claim 33, wherein for at least one of said at least one of said collected performance data values said mathematical formula comprises an identity function.

39. The apparatus of claim 33, wherein said means for collecting raw data comprises:

means for collecting said raw performance data utilizing at least one protocol selected from a group consisting of Simple Network Management Protocol (SNMP) and Internet Control Message Protocol (ICMP).

40. The apparatus of claim 33, wherein said means for collecting said raw network performance data comprises:

means for communicating with a plurality of remote node agents each associated with a network node on the computer network to receive said raw performance data for said associated network node.

41. The method of claim 1, wherein for at least one of the observable network resources, the mapping between the raw performance data and the component health score comprises a plurality of mappings between one or more of the raw performance data and corresponding subcomponent health scores, and wherein the step of converting said collected raw data into said component health score of the network resource comprises:

converting, in accordance with said mappings, said one or more raw performance data to said subcomponent health scores; and computing the component health score using said subcomponent health scores.

42. The computer-readable medium of claim 15, wherein for at least one of the observable network resources, the mapping between the raw performance data and the component health score comprises a plurality of mappings between one or more of the raw performance data and corresponding subcomponent health scores, and wherein the converting of said collected raw data into said component health score for the network resource comprises:

converting, in accordance with said mappings, said one or more raw performance data to said subcomponent health scores; and computing the component health score using said subcomponent health scores.

43. The apparatus of claim 24, wherein for at least one of the observable network resources, the mapping between the raw performance data and the component health score comprises a plurality of mappings between one or more of the raw performance data and corresponding subcomponent health scores; and wherein the calculation logic in calculating said composite health score is configured to convert, in accordance with said mappings, said one or more raw performance data to said subcomponent health scores, and to compute the component health score using said subcomponent health scores.

* * * * *